Figure 1:
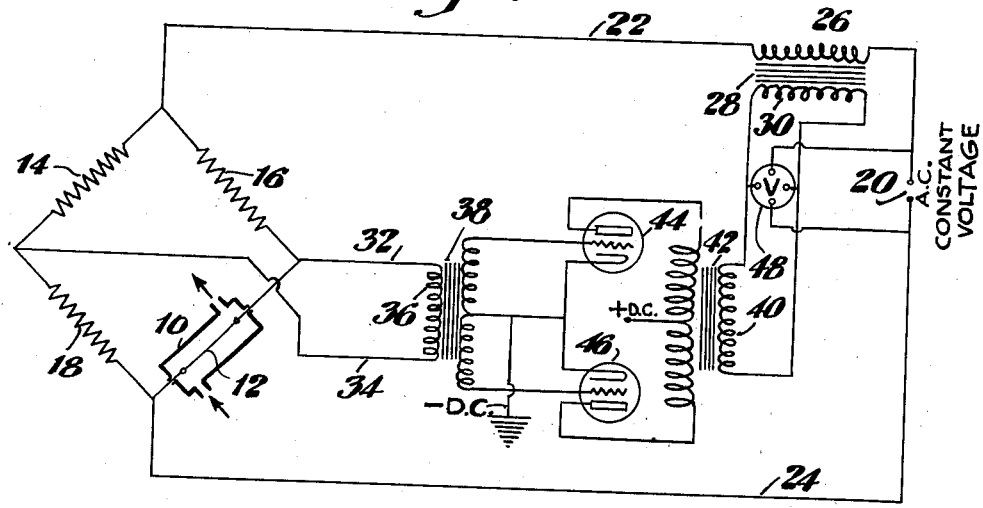

Oct. 29, 1940.   B. MILLER   2,219,540
GAS ANALYSIS METHOD AND APPARATUS
Filed Jan. 25, 1939

INVENTOR
BENJAMIN MILLER
BY
ATTORNEY

Patented Oct. 29, 1940

2,219,540

UNITED STATES PATENT OFFICE 2,219,540

GAS ANALYSIS METHOD AND APPARATUS

Benjamin Miller, Richmond Hill, N. Y., assignor to Power Patents Company, Hillside, N. J., a corporation of Maine Application January 25, 1939, Serial No. 252,737

10 Claims. (Cl. 23—232)

This invention relates to the analysis of gas, and more particularly to improved method and means for measuring quantitatively the amount of a combustion constituent in a gas.

One quite common method of analyzing gas for a combustion constituent consists in burning the gas at the surface of an electrically heated catalyst wire (said wire having a positive temperature coefficient of resistance and forming one arm of a Wheatstone bridge electric circuit which has been previously balanced in air at the ignition temperature of the gas), and measuring by means of a galvanometer connected across the bridge the degree of unbalance of the bridge caused by combustion of the gas. Thus the quality of the gas under examination is measured by a change in resistance of the active or catalyst wire arm of the Wheatstone bridge, and such change in resistance results from a change in the temperature of the wire which is caused by the combustion of the gas at the wire surface.

This method of gas analysis may develop serious errors. For example, when the wire temperature is raised above a certain point as a result of combustion on its surface of a gas having a relatively high proportion of combustion constituents, partial volatilization of the wire metal often occurs. In some gaseous atmospheres the wire metal is rendered inactive by deposition of a carbon coating or other poisoning reaction. Of course, any such change in the dimensions or activity of the wire requires recalibration of the wire before further reliable analyses can be made.

A primary object of the present invention is therefore to provide method and means whereby to measure the quality of a gas by combustion reaction at an electrically heated wire surface, without allowing the temperature of the wire to vary from an optimum temperature at which reaction will take place. A specific feature of the invention is that of promoting combustion of the gas at an electrically heated wire surface, and measuring the quality of the gas by measurement of the difference in electrical power input necessary in order to balance the temperature of the wire surface with and without combustion taking place. A more specific feature of the invention is the provision of method and means for effecting gas analysis wherein the temperature of a catalyst wire surface on which combustion of the gas takes place is balanced by cutting down the current supply automatically in proportion to the increase in heat developed by combustion so as to maintain the temperature substantially constant at a stable equilibrium value.

Essentially the invention rests on an improvement over the standard Wheatstone bridge combustion gas analyzer whereby any potential developed across the bridge as a result of bridge unbalance is amplified, and such amplified power is applied through a transformer to change the supply of electric heating current to the bridge in sufficient amount to maintain constant the temperature of the active arm of the bridge on which combustion takes place.

With the above and other objects and features in view, the invention consists in the improved method and means for analyzing gas for combustion constituents which is hereinafter described and more particularly defined by the accompanying claims.

Figure 2:
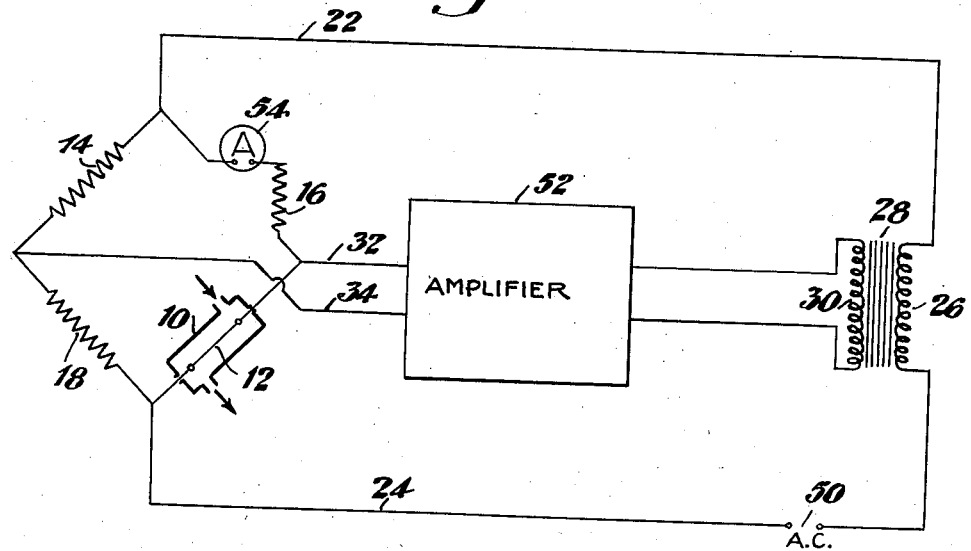

In the following description reference will be made to the attached drawing, in which:

Fig. 1 is an electrical wiring diagram of a preferred design of temperature balancing Wheatstone bridge gas analyzer embodying the features of the invention; and Fig. 2 is a diagram of a modified design adapting the analyzer of the invention for use with a source of A. C. energy which is not necessarily of constant potential.

Referring to the diagram illustrated in Fig. 1, the gas to be analyzed is conducted into and through a combustion cell 10 wherein it comes in contact with the surface of an electrically heated catalyst wire 12. Before entering the cell 10, the gas is conditioned to insure the presence therein of sufficient oxygen to burn any combustible components in the gas if the purpose of the analysis is to determine the amount of combustible components therein; or the gas may be analyzed for the presence of oxygen therein by adding thereto sufficient combustible to react with any oxygen present.

The wire 12 forms an active leg of a Wheatstone bridge electric circuit which preferably incorporates two balanced fixed resistances 14 and 16, and a compensating resistance 18 for balancing the resistance of wire 12. The bridge is preferably balanced at a temperature corresponding to the ignition temperature of any combustion constituents in the gas passing through the cell 10. The Wheatstone bridge of Fig. 1 is energized by an A. C. current of constant voltage supplied from a source 20 through leads 22 and 24. Lead 22 is shown as embracing the primary coil 26 of a bucking transformer 28. A secondary coil 30 of the transformer 28 is shown as embraced in the output circuit of a power amplifier, the input circuit of which is energized through leads 32 and 34 by any unbalance potential developed across the Wheatstone bridge between the junction points of resistances 14 and 18 and resistances 16 and 12, respectively. The power amplifier illustrated in Fig. 1 is a push-pull amplifier including in its input circuit a primary coil 36 of a transformer 38, and in its output circuit the econdary coil 40 of a transformer 42. Half of the secondary coil of transformer 38 is connected in a circuit embracing the grid and cathode of a triode tube 44, while the other half of the secondary or transformer 38 is in circuit with the grid and cathode of a second triode tube 46. The transformers 38 and 42 are the usual type of input and output transformer used in push-pull amplifiers. A source of D. C. current has its positive terminal connected to the mid-point of the primary coil of transformer 42, and its negative terminal connected to the mid-point of the secondary of transformer 38.

The push-pull amplifier illustrated in Fig. 1 operates to amplify any bridge unbalance potential which develops as a result of combustion of any combustible constituent in the gas passing through cell 10, and to apply such amplified unbalance potential to reduce the flow of current in the bridge energizing circuit 22—24, thereby reducing the bridge energizing current in amount just sufficient to maintain the temperature of the catalyst wire 12 at a constant predetermined optimum value. The voltage output of the amplifier measures the quality of the gas fed to the analyzer cell 10. This is indicated by a dynamometer voltmeter 48 having two coils, one of which is illustrated as connected across the source of A. C. energizing current 20, while the other coil of the voltmeter is connected across the output circuit of the power amplifier.

In the wiring diagram of Fig. 2, like parts are indicated by corresponding numerical designations. The apparatus of Fig. 2 differs from that of Fig. 1 primarily in employing a source 50 of energizing current for the Wheatstone bridge which need not be of constant voltage. The push-pull amplifier 52 has been illustrated diagrammatically as having an input circuit with leads 32 and 34 connected across the bridge for energizing by bridge unbalance potential. The output potential of amplifier 52 operates through the coil 30 of the bucking transformer 28 to reduce the energizing current of the bridge in proportion to the tendency of the bridge to become unbalanced, thereby reducing the electrical energy input to wire 12 by an amount substantially equal to the amount of heat developed by the combustion of gas at the surface of the active wire 12. The current supply to the wire 12 is measured by an ammeter 54 which is connected into the bridge in series circuit with the active catalyst wire 12, and the change in current is a measure of the gas quality. It is convenient to arrange that the full scale current reading of ammeter 54 is the current required to maintain wire 12 at a predetermined optimum temperature when air is flowing through cell 10.

Thus the apparatus of Fig. 2, as well as the apparatus of Fig. 1, operate automatically to maintain the catalyst wire 12 at a substantially constant temperature with and without combustion of gas taking place in the cell 12. In the apparatus of Fig. 2, as in the apparatus of Fig. 1, the power amplifier operates to change flow of energizing current to the bridge whenever there is even a slight potential drop across the bridge. The amplifier functions to maintain the bridge in an almost balanced condition.

The amplifier shown in Fig. 1 is a single stage amplifier, but any number of stages may be used consistent with the sensitivity desired. In the circuit shown in Fig. 1, the amplifier operates only to reduce current flow through wire 12, while in the circuit shown in Fig. 2 the amplifier may act to increase the current flow to wire 12 if the A. C. potential drops below normal. It is preferable that there be no phase shift in any stage of the amplifier except the 180° phase shift which may be necessary in a transformer. But if there is a phase shift in some part of the amplifier it should be corrected so that the overall result is that the current flowing through wire 12 due to the amplifier is 180° out of phase with the current flowing through wire 12 due to the A. C. source, in Fig. 1, and also in Fig. 2, when the amplifier is acting to compensate for combustion in cell 10; or in phase when the amplifier is acting to compensate for sub-normal voltage of source 50. In the apparatus shown in Fig. 2 the output of the amplifier may be affected both by combustion and by change of voltage of source 50, but the reading of ammeter 54 is independent of the voltage of source 50.

Having thus described the preferred form of the invention, what is claimed as new is:

1. In analyzing a gas for combustion components by burning the gas at the surface of an electrically heated wire forming one arm of a Wheatstone bridge, the method of compensating for increase of potential across said wire over that existing when the bridge is balanced which comprises, amplifying the bridge unbalance potential developed as a result of such increase of potential and applying such amplified potential to reduce the electric heating potential applied to the bridge.

2. In analyzing a gas for combustion components by burning the gas at the surface of an electrically heated wire forming one arm of a Wheatstone bridge, the method of compensating for decrease of potential of the source of heating current which comprises amplifying the bridge unbalance potential developed as a result of said decrease in potential of the source, and applying such amplified potential to increase the potential applied to the bridge.

3. In analyzing gas for a combustion component, the steps comprising passing electric current through a Wheatstone bridge electric circuit and thereby heating an active wire arm of the bridge to the ignition temperature of any combustion component in a gas to be analyzed, balancing the bridge at said temperature while immersing said wire in air, thereafter immersing the active wire in the gas to be analyzed while continuing to apply electric heating current thereto, amplifying any unbalance potential developed across the bridge as a result of combustion at the surface of the active wire, applying the amplified potential to the bridge in opposition to the potential of the source of heating current, thereby reducing the supply of heating current, and maintaining substantially constant the temperature of the active wire.

4. In analyzing a gas for combustion components by burning the gas at the surface of an electrically heated active wire having a positive temperature coefficient of resistance and forming one arm of a Wheatstone bridge, the method of compensating for change of potential across said wire from that existing when the bridge is balanced, which comprises amplifying the bridge unbalance potential developed as a result of such change of potential, then applying such amplified potential to the bridge in a direction which maintains the temperature of the said wire substantially constant.

5. The method as described in claim 4 together with the additional step of measuring the amplified potential.

6. The method as defined in claim 4 together with the step of measuring the current passing through the active wire.

7. In gas analyzing apparatus, a combustion cell, a Wheatstone bridge electric circuit including one active wire leg mounted in said cell and having a resistance which changes with the temperature, a source of current for energizing the bridge, said bridge being balanced with said wire immersed in air at a preselected temperature, an impedance connected between the source of current and the bridge, and means responsive to unbalance potential of said bridge, said means being adapted to impress upon said impedance a potential having the same wave shape as said unbalance potential but great in magnitude with respect thereto, whereby the potential applied to said bridge is made to be the algebraic sum of the potential of said source and the potential impressed by said last-named means on said impedance.

8. In gas analyzing apparatus, a cell through which the gas to be analyzed passes, a Wheatstone bridge electric circuit having one active wire arm with a positive temperature coefficient of resistance which is mounted in said cell, a source of A. C. current, a conductor connecting the A. C. source with the bridge, a transformer having a primary coil connected to form part of said conductor, an amplifier having an input circuit connected across the bridge, an output circuit for the amplifier embracing a secondary coil of said transformer, and an ammeter connected in the bridge in series circuit with the active arm.

9. In gas analyzing apparatus, a combustion cell through which gas to be analyzed passes, a Wheatstone bridge electric circuit having one active arm with a positive temperature co-efficient of resistance which is mounted in said cell, a source of A. C. current of constant potential for energizing said bridge, a conductor connecting the A. C. source and the bridge, a transformer having a primary coil connected as part of the conductor, an amplifier having its input circuit connected across the bridge, an output circuit for the amplifier embracing the secondary coil of the transformer, and a dynaomometer voltmeter having one coil connected across the source of constant A. C. current and having a second coil connected across the output circuit of the amplifier.

10. In gas analyzing apparatus, a cell through which the gas to be analyzed passes, a Wheatstone bridge electric circuit having one active wire arm with a positive temperature coefficient of resistance which is mounted in said cell, a source of A. C. current, a conductor connecting the A. C. source with the bridge, a transformer having a primary coil connected to from part of said conductor, an amplifier having an input circuit connected across the bridge, and an output circuit for the amplifier embracing the secondary coil of the transformer.

BENJAMIN MILLER.